US009691187B2

(12) United States Patent
Wu

(10) Patent No.: US 9,691,187 B2
(45) Date of Patent: Jun. 27, 2017

(54) CONTROL DEVICE FOR VEHICLE HIRING AND CONTROL SYSTEM USING SAME

(71) Applicant: HON HAI PRECISION INDUSTRY CO., LTD., New Taipei (TW)

(72) Inventor: E-In Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 94 days.

(21) Appl. No.: 14/753,832

(22) Filed: Jun. 29, 2015

(65) Prior Publication Data

US 2016/0171807 A1 Jun. 16, 2016

(30) Foreign Application Priority Data

Dec. 10, 2014 (TW) ............................ 103143177 A

(51) Int. Cl.

*B60R 25/10* (2013.01)
*G07B 15/00* (2011.01)
*G07C 9/00* (2006.01)

(52) U.S. Cl.

CPC ......... *G07B 15/00* (2013.01); *G07C 9/00896* (2013.01); *G07C 9/00944* (2013.01); *G07C 2009/00769* (2013.01)

(58) Field of Classification Search

CPC .......... B60R 25/24; G07C 2009/00373; G07C 2009/00603; G07C 2009/00611; G07C 2009/00619

See application file for complete search history.

(56) References Cited

U.S. PATENT DOCUMENTS

2007/0188310 A1* 8/2007 Mori ...................... B60R 25/24
340/426.36
2009/0031767 A1* 2/2009 Ko ......................... B60R 25/04
70/336

FOREIGN PATENT DOCUMENTS

CN 201025541 Y 2/2008
CN 102278008 B 7/2013

* cited by examiner

*Primary Examiner* — Kevin Kim
(74) *Attorney, Agent, or Firm* — Steven Reiss

(57) ABSTRACT

A control system for vehicle hiring includes a control device and a wireless smart key. The control device includes a first microprogram control unit. The wireless smart key includes a second microprogram control unit, a positive electrode and a negative electrode both electronically coupled to the second microprogram control unit. When the first microprogram control unit receives a first sensing signal or a second sensing signal, the first microprogram control unit is electronically coupled to the positive electrode and the negative electrode.

19 Claims, 1 Drawing Sheet

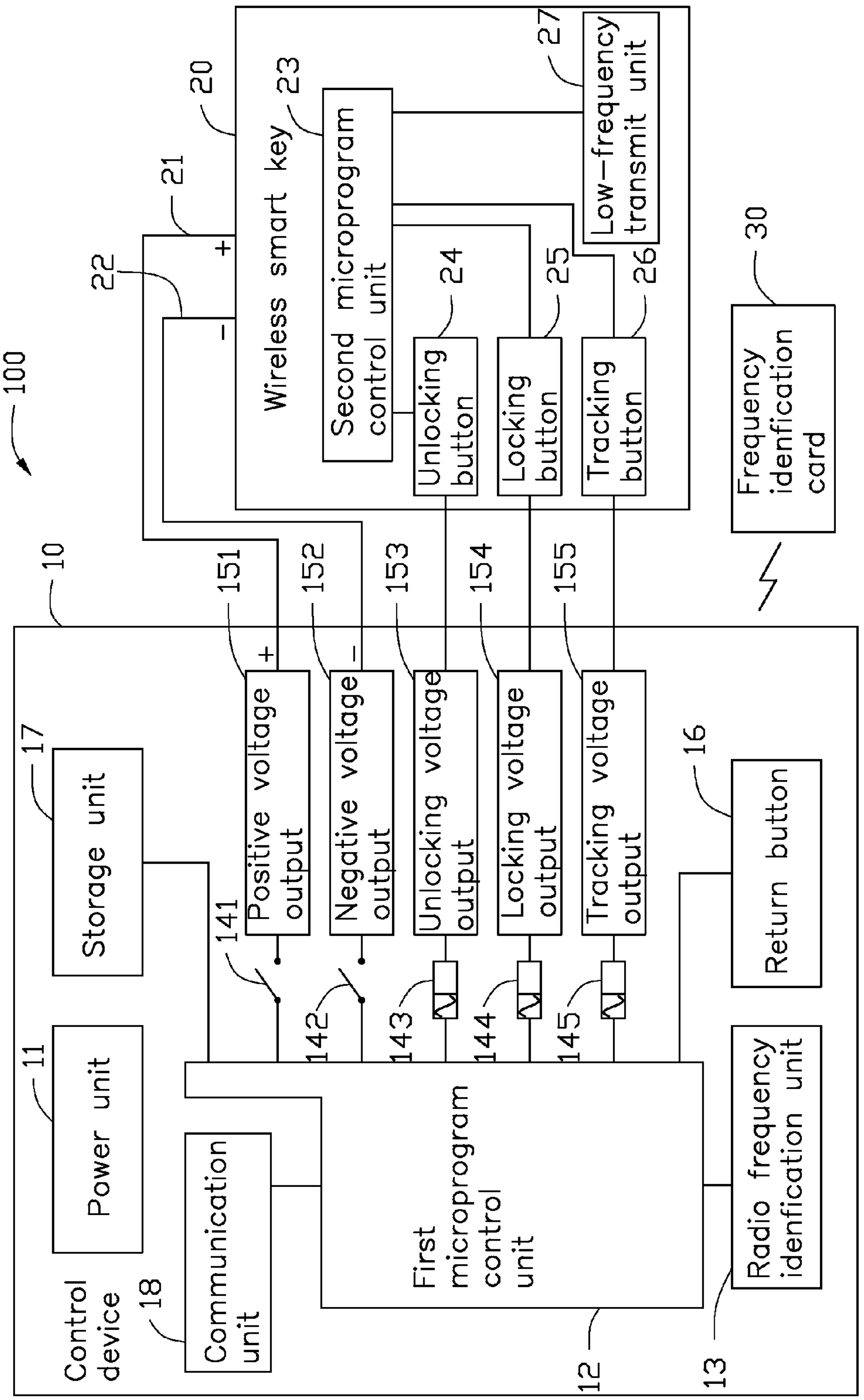
100
10
20
Wireless smart key
21
22
+
-
23
Second microprogram control unit
24
Unlocking button
25
Locking button
26
Tracking button
27
Low-frequency transmit unit
30
Frequency idenfication card
151
152
153
154
155
Positive voltage output
Negative voltage output
Unlocking voltage output
Locking voltage output
Tracking voltage output
141
142
143
144
145
17
Storage unit
11
Power unit
16
Return button
First microprogram control unit
12
Radio frequency idenfication unit
13
Communication unit
18
Control device

CONTROL DEVICE FOR VEHICLE HIRING AND CONTROL SYSTEM USING SAME

FIELD

The subject matter herein generally relates to control devices and control systems using same, and especially to a control device for a hiring vehicle with a wireless smart key and a control system using same.

BACKGROUND

At present, a lot of self-help hiring vehicles are zoomed on the market. The hiring vehicles are generally converted by the vehicles.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

The FIGURE is a block diagram of an embodiment of a control system for vehicle hiring.

DETAILED DESCRIPTION

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawing is not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

The FIGURE shows a control system for vehicle hiring 100. The control system for vehicle hiring 100 can include a control device 10 and a wireless smart key 20. The control device 10 can be attached to a hiring vehicle. The wireless smart key 20 can be electrically coupled to the control device 10.

The control device 10 can include a power unit 11, a first microprogram control unit 12, a radio frequency idenfication unit 13, a first switch 141, a second switch 142, a first relay 143, a second relay 144, a third relay 145, a positive voltage output 151, a negative voltage output 152, an unlocking voltage output 153, a locking voltage output 154, a tracking voltage output 155, a return button 16, a storage unit 17 and a communication unit 18.

The power unit 11 can be used to power the control device 10 except the power unit 11. In at least one embodiment, the power unit 11 can be an external element.

The first microprogram control unit 12 can be electronically coupled to the radio frequency idenfication unit 13. The first switch 141 can be electronically coupled between the first microprogram control unit 12 and the positive voltage output 151. The second switch 142 can be electronically coupled between the first microprogram control unit 12 and the negative voltage output 152. The first relay 143 can be electronically coupled between the first microprogram control unit 12 and the unlocking voltage output 153. The second relay 144 can be electronically coupled between the first microprogram control unit 12 and the locking voltage output 154. The third relay 145 can be electronically coupled between the first microprogram control unit 12 and the tracking voltage output 155. The first microprogram control unit 12 can be further electronically coupled to the return button 16, the storage unit 17 and the communication unit 18 respectively.

The radio frequency idenfication unit 13 can be used to identify a radio frequency idenfication card 30. The storage unit 17 can be used to store a unique identifier.

The wireless smart key 20 can include a positive electrode 21, a negative electrode 22, a second microprogram control unit 23, an unlocking button 24, a locking button 25, a tracking button 26 and a low-frequency transmit unit 27.

The positive electrode 21 can be electronically coupled to the positive voltage output 151, and the negative electrode 22 can be electronically coupled to the negative voltage output 152, such that the power unit 11 can power the wireless smart key 20.

The unlocking button 24 can be electronically coupled between the unlocking voltage output 153 and the second microprogram control unit 23. The locking button 25 can be electronically coupled between the locking voltage output 154 and the second microprogram control unit 23. The tracking button 26 can be electronically coupled between the tracking voltage output 155 and the second microprogram control unit 23. The second microprogram control unit 23 can be further electronically coupled to the low-frequency transmit unit 27.

When the vehicle is for hire, that is, the radio frequency idenfication unit 13 cannot identify a radio frequency idenfication card 30 matched with the radio frequency idenfication unit 13, the first microprogram control unit 12 can be used to control the first switch 141 and the second switch 142 to turn off, such that the power unit 11 cannot power the wireless smart key 20, as if the wireless smart key 20 is not on the vehicle.

When a user holds the radio frequency idenfication card 30 and further enables the radio frequency idenfication card 30 close to the radio frequency idenfication unit 13, the radio frequency idenfication unit 13 can sense the radio frequency idenfication card 30, and further generate a first sensing signal containing an identifier of the radio frequency idenfication card 30, and further submit the first sensing signal to the first microprogram control unit 12.

The first microprogram control unit 12 can receive the first sensing signal, and read the identifier from the first sensing signal, and further compare the identifier with the unique identifier stored in the storage unit 17, and generate an error warning when determined that the identifier is not equal to the unique identifier, and further control the first switch 141 and the second switch 142 to turn on when determined that the identifier is equal to the unique identifier, such that the power unit 11 can power the wireless smart key 20 via the positive voltage output 151 and the negative voltage output 152, as if a battery powers the wireless smart key 20. The first microprogram control unit 12 can further control the first relay 143 to turn on, such that the first microprogram control unit 12 can submit an unlock signal of analog pressing the unlocking button 24, as if the unlocking button 24 is mechanically pressed down, to the second microprogram control unit 23 and the unlock signal is submitted to the second microprogram control unit 23 via the unlocking voltage output 153.

The second microprogram control unit 23 can control the low-frequency transmit unit 27 to transmit a low-frequency signal for unlocking the vehicle after receiving the unlock signal.

The vehicle can be unlocked in response of receiving the low-frequency signal.

When the user is to get off the vehicle to handle affairs, the user can hold the radio frequency idenfication card 30 and further enable the radio frequency idenfication card 30 close to the radio frequency idenfication unit 13, the radio frequency idenfication unit 13 can sense the radio frequency idenfication card 30 next time, and further generate a second sensing signal containing an identifier of the radio frequency idenfication card 30, and further submit the second sensing signal to the first microprogram control unit 12.

The first microprogram control unit 12 can receive the second sensing signal, and read the identifier from the second sensing signal, and further compare the identifier with the unique identifier stored in the storage unit 17, and generate an error warning when determined that the identifier is not equal to the unique identifier, and further control the second relay 144 to turn on when determined that the identifier is equal to the unique identifier, such that the first microprogram control unit 12 can submit an lock signal of analog pressing the locking button 25, as if the locking button 25 is mechanically pressed, to the second microprogram control unit 23 and the lock signal is submitted to the second microprogram control unit 23 via the locking voltage output 154.

In at least one embodiment, the first microprogram control unit 12 can control the second relay 144 to turn on when determined that the identifier is equal to the unique identifier, such that the first microprogram control unit 12 can submit an lock signal of analog pressing the locking button 25 to the second microprogram control unit 23, and further control the first switch 141 and the second switch 142 to turn off, so as to save the power of the power unit 11.

The second microprogram control unit 23 can control the low-frequency transmit unit 27 to transmit a low-frequency signal for locking the vehicle after receiving the lock signal.

The vehicle can be locked in response of receiving the low-frequency signal.

When the user finishes handing affairs, and returns to the vehicle, the user can hold the radio frequency idenfication card 30 and enable the radio frequency idenfication card 30 close to the radio frequency idenfication unit 13, the radio frequency idenfication unit 13 can sense the radio frequency idenfication card 30 third time, the first microprogram control unit 12 can control the first relay 143 to turn on again, such that the first microprogram control unit 12 can submit an unlock signal of analog pressing the unlocking button 24 to the second microprogram control unit 23. Also, when the radio frequency idenfication unit 13 senses the radio frequency idenfication card 30 fourth time, the first microprogram control unit 12 can control the second relay 144 to turn on again, such that the first microprogram control unit 12 can submit a lock signal of analog pressing the locking button 25 to the second microprogram control unit 23, and the like.

When a first tracking signal is transmitted by an electronic device, such as a telephone, the communication unit 18 can receive the tracking signal, the first microprogram control unit 12 can control the third relay 145 to turn on in response to the first tracking signal, such that the first microprogram control unit 12 can submit a second tracking signal to the second microprogram control unit 23, and the second tracking signal is submitted to the second microprogram control unit 23 via the tracking voltage output 155. The second microprogram control unit 23 can control the communication unit 18 to transmit a back signal to the electronic device in response to the second tracking signal.

A return signal can be generated in response of a pressing operation applied on the return button 16. After the return signal is generated, if the user gets off the vehicle and enables the radio frequency idenfication card 30 close to the radio frequency idenfication unit 13, the radio frequency idenfication unit 13 can sense the radio frequency idenfication card 30 again and further generate a third sensing signal.

After the first microprogram control unit 12 receives the return signal and the third sensing signal, the first microprogram control unit 12 can read the identifier from the third sensing signal, and further compare the identifier with the unique identifier stored in the storage unit 17, and generate an error warning when determined that the identifier is not equal to the unique identifier, and further control the second relay 144 to turn on when determined that the identifier is equal to the unique identifier, such that the first microprogram control unit 12 can submit an lock signal of analog pressing the locking button 25, and the lock signal is submitted to the second microprogram control unit 23 via the locking voltage output 154, and further control the first switch 141 and the second switch 142 to turn off such that the power unit 11 cannot power the wireless smart key 20. The second microprogram control unit 23 can receive control the low-frequency transmit unit 27 to transmit a low-frequency signal for locking the vehicle in response of receiving the lock signal, and the vehicle can be locked according to the low-frequency signal. At this time, if the radio frequency idenfication card 30 is close to the radio frequency idenfication unit 13 again, the radio frequency idenfication unit 13 cannot sense the radio frequency idenfication card 30 again unless the radio frequency idenfication card 30 is reset.

In at least one embodiment, after the first relay 143, the second relay 144 and the third relay 145 are turned on, if there is no voltage applied on the first relay 143, the second relay 144 and the third relay 145, the first relay 143, the second relay 144 and the third relay 145 can be turned off automatically.

In at least one embodiment, the control device 10 can further include a number of relays and a number of outputs, the wireless smart key 20 can further include a number of press buttons for achieving a number of functions, each relay and each output can be electrically coupled to one press button to achieve a function.

In at least one embodiment, if the first switch 141 can be electrically coupled to the positive electrode 21 directly, the positive voltage output 151 can be thus omitted.

In at least one embodiment, if the second switch 142 can be electrically coupled to the negative electrode 22 directly, the negative voltage output 152 can be thus omitted.

In at least one embodiment, if the first relay 143 can be electrically coupled to the unlocking button 24 directly, the unlocking voltage output 153 can be thus omitted.

In at least one embodiment, if the second relay 144 can be electrically coupled to the locking button 25 directly, the locking voltage output 154 can be thus omitted.

In at least one embodiment, if the third relay 145 can be electrically coupled to the tracking button 26 directly, the tracking voltage output 155 can be thus omitted.

In at least one embodiment, if the hiring vehicle has no tracking mode, the tracking button 26, the tracking voltage output 155 and the third relay 145 can be thus omitted.

In at least one embodiment, the radio frequency idenfication card 30 can be an electronic device with function of radio frequency idenfication, such as a telephone.

In at least one embodiment, if the communication unit 18 can receive the first sensing signal, the second sensing signal and the third sensing signal transmitted from an electronic device, the radio frequency idenfication unit 13 and the radio frequency idenfication card 30 can be thus omitted.

In at least one embodiment, if the communication unit 18 can receive a return signal transmitted from an electronic device, the return button 16 can be thus omitted.

In at least one embodiment, the unlocking button and the locking button can be omitted, and the unlocking and locking for the vehicle 10 can be achieved by other ways.

The embodiments shown and described above are only examples. Many details are often found in the art such as the other features of control device for vehicle hiring and control system using same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A control system for vehicle hiring comprising:
a control device comprising:
a first microprogram control unit; and
a wireless smart key configured to be electronically coupled to the control device comprising:
a second microprogram control unit;
a positive electrode electronically coupled to the second microprogram control unit;
a negative electrode electronically coupled to the second microprogram control unit;
an unlocking button electronically coupled to the second microprogram control unit; and
a locking button electronically coupled to the second microprogram control unit;
wherein, when the first microprogram control unit receives a first sensing signal, the first microprogram control unit is electronically coupled to the positive electrode, the negative electrode, and the locking button respectively, such that the first microprogram control unit is able to generate an unlock signal of analog pressing the unlocking button;
wherein, when the first microprogram control unit receives a second sensing signal, the first microprogram control unit is electronically coupled to the positive electrode, the negative electrode, and the locking button respectively, such that the first microprogram control unit is able to generate a lock signal of analog pressing the locking button.

2. The control system of claim 1, wherein the control device further comprises a storage unit storing a unique identifier, the first microprogram control unit reads an identifier containing in the first sensing signal, and further compares the identifier with the unique identifier, and the first microprogram control unit is electronically coupled to the positive electrode, the negative electrode and the unlocking button when it is determined that the identifier is equal to the unique identifier.

3. The control system of claim 2, wherein the first microprogram control unit generates an error warning when it is determined that the identifier is not equal to the unique identifier.

4. The control system of claim 1, wherein the control device further comprises a storage unit storing a unique identifier, the first microprogram control unit reads an identifier containing in the second sensing signal, and further compares the identifier with the unique identifier, and the first microprogram control unit is electronically coupled to the positive electrode, the negative electrode and the locking button when it is determined that the identifier is equal to the unique identifier.

5. The control system of claim 4, wherein the first microprogram control unit generates an error warning when it is determined that the identifier is not equal to the unique identifier.

6. The control system of claim 1, wherein the control device further comprises a radio frequency idenfication unit electronically coupled to the first microprogram control unit, the first sensing signal is generated by the radio frequency idenfication unit sensing a radio frequency idenfication card one time, and the second sensing signal is generated by the radio frequency idenfication unit sensing the radio frequency idenfication card next time.

7. The control system of claim 6, wherein the control device further comprises a return button electronically coupled to the first microprogram control unit, a return signal is generated in response of a pressing operation applied on the return button, the first microprogram control unit further receives a third sensing signal generated by the radio frequency idenfication unit, the first microprogram control unit is electronically coupled to the lock button in response of the return signal and the third sensing signal, such that the first microprogram control unit is able to generate the lock signal of analog pressing the locking button, and the first microprogram control unit further disconnects with the positive electrode and the negative electrode in response of the return signal and the third sensing signal.

8. The control system of claim 1, wherein the control device comprises:
a first switch electronically coupled between the first microprogram control unit and the positive electrode;
a second switch electronically coupled between the first microprogram control unit and the negative electrode;
a first relay electronically coupled between the first microprogram control unit and the unlocking button; and
a second relay electronically coupled between the first microprogram control unit and the locking button;
wherein when the first microprogram control unit receives the first sensing signal, the first microprogram control unit controls the first switch, the second switch and the first relay to turn on;
wherein when the first microprogram control unit receives the second sensing signal, the first microprogram control unit controls the first switch, the second switch and the second relay to turn on.

9. The control system of claim 8, wherein the control device further comprises:

a positive voltage output electronically coupled between the first switch and the positive electrode;

a negative voltage output electronically coupled between the second switch and the negative electrode;

an unlocking voltage output electronically coupled between the first relay and the unlocking button; and a locking voltage output electronically coupled between the second relay and the locking button.

10. The control system of claim 1, wherein the control device further comprises a tracking voltage output electronically coupled to the first microprogram control unit; the wireless smart key further comprises a tracking button electronically coupled between the tracking voltage output and the second microprogram control unit, the first microprogram control unit controls the second microprogram control unit to transmit a second tracking signal in response of receiving a first tracking signal.

11. The control system of claim 1, wherein the control device further comprises a power unit, the power unit powers the control device, and when the first microprogram control unit is electronically coupled to the positive electrode and the negative electrode, the power unit further powers the wireless smart key.

12. The control system of claim 1, wherein the control device further comprises a communication unit, the first sensing signal, the second sensing signal, a third sensing signal and a return signal are received by the communication unit.

13. A control device comprising:

a first microprogram control unit; and a first switch electronically coupled to a second microprogram control unit of a wireless smart key;

a second switch electronically coupled to the second microprogram control unit;

a first relay electronically coupled to the second microprogram control unit; and a second relay electronically coupled to the second microprogram control unit;

wherein, when the first microprogram control unit receives a first sensing signal, the first microprogram control unit is electronically coupled to the first switch, the second switch and the first relay;

wherein, when the first microprogram control unit receives a second sensing signal, the first microprogram control unit is electronically coupled to the first switch, the second switch and the second relay.

14. The control device of claim 13, wherein the control device further comprises:

a positive voltage output electronically coupled between the first switch and the second microprogram control unit;

a negative voltage output electronically coupled between the second switch and the second microprogram control unit;

an unlocking voltage output electronically coupled between the first relay and the second microprogram control unit; and a locking voltage output electronically coupled between the second relay and the second microprogram control unit.

15. The control device of claim 13, wherein the control device further comprises:

a return button electronically coupled to the first microprogram control unit, wherein a return signal is generated in response of a pressing operation applied on the return button, the first microprogram control unit further receives a third sensing signal, the first microprogram control unit is electronically coupled to the second relay in response of the return signal and the third sensing signal to generate a lock signal of analog pressing a locking button, and the first microprogram control unit disconnects with the first switch and the second switch in response of the return signal and the third sensing signal.

16. The control device of claim 13, wherein the control device further comprises a power unit, the power unit powers the control device.

17. The control device of claim 13, wherein the control device further comprises a communication unit, the first sensing signal, the second sensing signal, a third sensing signal and a return signal are received by the communication unit.

18. The control device of claim 13, wherein the control device further comprises a radio frequency idenfication unit electronically coupled to the first microprogram control unit, the first sensing signal is generated by the radio frequency idenfication unit sensing a radio frequency idenfication card one time, and the second sensing signal is generated by the radio frequency idenfication unit sensing the radio frequency idenfication card next time, a third sensing signal is generated by the radio frequency idenfication unit sensing the radio frequency idenfication card another time after receiving a return signal.

19. A control system for vehicle hiring comprising:

a control device comprising:

a first microprogram control unit; and a power unit, the power unit powering the control device; and a wireless smart key configured to be electronically coupled to the control device comprising:

a second microprogram control unit;

a positive electrode electronically coupled to the second microprogram control unit; and a negative electrode electronically coupled to the second microprogram control unit;

wherein, when the first microprogram control unit receives a first sensing signal or a second sensing signal, the first microprogram control unit is electronically coupled to the positive electrode and the negative electrode;

wherein when the first microprogram control unit is electronically coupled to the positive electrode and the negative electrode, the power unit further powers the wireless smart key.

* * * * *